US009412235B2

(12) United States Patent
Kup-Ferroth

(10) Patent No.: US 9,412,235 B2
(45) Date of Patent: Aug. 9, 2016

(54) GAMING SYSTEM, A METHOD OF GAMING AND A LINKED GAME CONTROLLER

(75) Inventor: Peter Thomas Kup-Ferroth, Lane Cove (AU)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 782 days.

(21) Appl. No.: 12/775,975

(22) Filed: May 7, 2010

(65) Prior Publication Data

US 2010/0285886 A1 Nov. 11, 2010

(30) Foreign Application Priority Data

May 8, 2009 (AU) ................................ 2009902056

(51) Int. Cl.
*G06F 17/00* (2006.01)
*G06F 19/00* (2011.01)
*G07F 17/32* (2006.01)

(52) U.S. Cl.
CPC ............ *G07F 17/3272* (2013.01); *G07F 17/32* (2013.01); *G07F 17/3239* (2013.01); *G07F 17/3244* (2013.01)

(58) Field of Classification Search
CPC . G07F 17/32; G07F 17/3239; G07F 17/3244; G07F 17/3272
USPC ......... 463/25, 27, 16–20, 29, 40–43; 273/139
See application file for complete search history.

(56) References Cited

U.S. PATENT DOCUMENTS

| | | | | |
|---|---|---|---|---|
| 6,089,980 | A * | 7/2000 | Gauselmann | 463/27 |
| 7,004,466 | B2 * | 2/2006 | Gauselmann | 273/139 |
| 7,029,395 | B1 * | 4/2006 | Baerlocher | 463/20 |
| 7,377,514 | B1 | 5/2008 | Timpano et al. | |
| 8,235,792 | B2 * | 8/2012 | Kelly | G07F 17/32 463/20 |
| 8,298,066 | B2 * | 10/2012 | Kelly et al. | 463/20 |
| 8,360,864 | B2 * | 1/2013 | Dickerson | G07F 17/32 463/16 |
| 2003/0036430 | A1 * | 2/2003 | Cannon | 463/42 |
| 2003/0104853 | A1 * | 6/2003 | Tessmer et al. | 463/16 |
| 2003/0119576 | A1 * | 6/2003 | McClintic et al. | 463/20 |
| 2003/0148804 | A1 * | 8/2003 | Ikeya | G07F 17/32 463/16 |
| 2003/0153385 | A1 * | 8/2003 | Ikeya | G07F 17/32 463/31 |
| 2003/0199308 | A1 * | 10/2003 | Parker | 463/20 |
| 2005/0026674 | A1 * | 2/2005 | Wolf et al. | 463/16 |
| 2006/0009283 | A1 * | 1/2006 | Englman | G07F 17/32 463/29 |
| 2006/0046823 | A1 * | 3/2006 | Kaminkow et al. | 463/16 |
| 2006/0073897 | A1 * | 4/2006 | Englman et al. | 463/42 |
| 2007/0060314 | A1 * | 3/2007 | Baerlocher et al. | 463/25 |
| 2008/0020817 | A1 | 1/2008 | Kaminkow et al. | |
| 2008/0026824 | A1 * | 1/2008 | Muir | 463/25 |

(Continued)

FOREIGN PATENT DOCUMENTS

| | | |
|---|---|---|
| JP | 2006198438 A | 8/2006 |
| JP | 2006198439 A | 8/2006 |

(Continued)

*Primary Examiner* — Milap Shah

(74) *Attorney, Agent, or Firm* — McAndrews, Held & Malloy, Ltd.

(57) ABSTRACT

A gaming system having a plurality of gaming devices linked to a game controller. The linked game controller conducts a linked game in which eligible ones of the gaming devices participate and any award is shared between the participating gaming devices. The linked game controller conducts the linked game by generating at least one game outcome, and evaluating each game outcome based on the number of participating gaming devices.

29 Claims, 9 Drawing Sheets

(56) References Cited

U.S. PATENT DOCUMENTS

| | | | | |
|---|---|---|---|---|
| 2008/0045287 | A1 | 2/2008 | Amirsadri et al. | |
| 2008/0051168 | A1 | 2/2008 | Kaminkow et al. | |
| 2008/0064492 | A1 | 3/2008 | Oosthoek | |
| 2008/0070702 | A1 | 3/2008 | Kaminkow et al. | |
| 2008/0096656 | A1 | 4/2008 | Lemay et al. | |
| 2008/0108423 | A1 * | 5/2008 | Benbrahim et al. | 463/25 |
| 2008/0199834 | A1 | 8/2008 | Taillefer | |
| 2008/0214267 | A1 * | 9/2008 | Ghaly | 463/17 |
| 2008/0274786 | A1 | 11/2008 | Wilson | |
| 2009/0124345 | A1 * | 5/2009 | Gilmore et al. | 463/20 |
| 2009/0124371 | A1 * | 5/2009 | Gilmore et al. | 463/27 |
| 2009/0124385 | A1 * | 5/2009 | Cuddy et al. | 463/42 |
| 2009/0239632 | A1 * | 9/2009 | Leupp et al. | 463/20 |
| 2009/0270165 | A1 * | 10/2009 | Dias Pires | 463/20 |
| 2009/0325673 | A1 * | 12/2009 | Kelly | G07F 17/3274 463/20 |
| 2011/0009187 | A1 * | 1/2011 | Mastropietro | 463/25 |

FOREIGN PATENT DOCUMENTS

| | | | |
|---|---|---|---|
| JP | 2006198440 | A | 8/2006 |
| JP | 2008067731 | A | 3/2008 |
| WO | 2008104834 | A2 | 9/2008 |
| WO | 2008137878 | A2 | 11/2008 |

* cited by examiner

GAMING SYSTEM, A METHOD OF GAMING AND A LINKED GAME CONTROLLER

RELATED APPLICATIONS

This application claims priority to Australian Provisional Application No. 2009902056, having a filing date of May 8, 2009, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system, a method of gaming and a linked game controller.

In some gaming systems, a player of an individual gaming machine can qualify to play a bonus game conducted by another gaming apparatus. For example, a particular gaming outcome may entitle the player to the bonus game.

In other gaming systems a plurality of players may qualify to play a bonus game where players compete against one another, with one or more players receiving an award based on their placing in the bonus game.

While such gaming systems provide players with enjoyment, a need exists for alternative gaming systems in order to maintain or increase player enjoyment.

BRIEF SUMMARY OF THE INVENTION

In a first aspect, the invention provides a gaming system comprising:

a plurality of gaming devices; and a linked game controller in data communication with the plurality of gaming devices, the linked game controller arranged to conduct a linked game in which eligible ones of the gaming devices participate and any award is shared between the participating gaming devices, wherein the linked game controller is arranged to conduct the linked game by generating at least one game outcome, and evaluating each game outcome to determine any award associated with the linked game to share based on the number of participating gaming devices.

In an embodiment, generating a game outcome comprises selecting a plurality of symbols for display at a plurality of display positions on at least one display controlled by the linked game controller and evaluating each game outcome comprises evaluating the displayed symbols based on an evaluation entitlement.

In an embodiment, the linked game controller is arranged to establish the evaluation entitlement of the participating gaming devices prior to evaluating a game outcome and to evaluate each game based on the established evaluation entitlement.

In an embodiment, the linked game controller is arranged to establish the evaluation entitlement by determining a number of win lines of an available number of win lines to be used in evaluation of the game outcome, each win line extending through a plurality of display positions.

In an embodiment, a set number of win lines is added for each participating gaming device.

In an embodiment, the linked game controller is arranged to establish the evaluation entitlement by determining a number of active display positions to be used in forming combinations of display positions to be used in evaluation of the game outcome.

In an embodiment, the display positions correspond to a plurality of reels when the reels are stopped and the active display positions correspond to all display positions of each selected reel and at least one designated display position of each other reel, and wherein the number of selected reels corresponds to the number of participating gaming devices.

In an embodiment, any award is shared in proportion to the number of gaming devices.

In an embodiment, any award is shared in proportion to the number credits wagered per evaluation entitlement on each gaming device.

In an embodiment, any award is shared in proportion to the number credits wagered on each gaming device.

In an embodiment, any award is based on a number of games played on each gaming device in a designated period.

In an embodiment, each of the plurality of gaming devices is individually operable to play at least one game and the linked game is played in addition to the at least one game.

In an embodiment, the linked game controller comprises a data communications interface for communicating with at least participating ones of the gaming devices and a participation module for determining from the communication with at least participating ones of the gaming devices, the number of participating gaming devices.

In an embodiment, the data communication interface is arranged to poll each of the gaming devices whereby the participation module can determine based on any response to the polling whether a gaming device is participating.

In an embodiment, the data communication interface is arranged to monitor for a communication from each of the gaming devices indicative that the gaming device is participating whereby the participation module can determine based on monitored communication whether a gaming device is participating.

In an embodiment, the linked game controller comprises a memory storing game program code specifying game rules for generation and evaluation of a game outcome and a processor for executing the game program code.

In an embodiment, each gaming device comprises a communication module arranged to communicate with the linked game controller to enable the game controller to determine whether a gaming device is participating.

In an embodiment, each gaming device comprises a game controller operable to enable at least a base game to be played with the gaming device.

In a second aspect, the invention provides a method of gaming comprising conducting a linked game in which eligible ones of the gaming devices participate and any award is shared between the participating gaming devices, by:

generating at least one game outcome; and evaluating each game outcome to determine any award associated with the linked game to share based on the number of participating gaming devices.

In an embodiment, generating a game outcome comprises selecting a plurality of symbols for display at a plurality of display positions on at least one display controlled by the linked game controller and evaluating each game outcome comprises evaluating the displayed symbols based on an evaluation entitlement.

In an embodiment, the method comprises establishing the evaluation entitlement of the participating gaming devices prior to evaluating a game outcome and to evaluate each game based on the established evaluation entitlement.

In an embodiment, establishing the evaluation entitlement comprises determining a number of win lines of an available number of win lines to be used in evaluating the game outcome, each win line extending through a plurality of display positions.

In an embodiment, a set number of win lines is added for each participating gaming device.

In an embodiment, establishing the evaluation entitlement comprises determining a number of active display positions to be used in forming combinations of display positions to be used in evaluation of the game outcome.

In an embodiment, the display positions correspond to a plurality of reels when the reels are stopped and the active display positions correspond to all display positions of each selected reel and at least one designated display position of each other reel, and wherein the number of selected reels corresponds to the number of participating gaming devices.

In an embodiment, the method comprises sharing any award in proportion to the number of gaming devices.

In an embodiment, the method comprises sharing any award in proportion to the number credits wagered per evaluation entitlement on each gaming device.

In an embodiment, the method comprises sharing any award in proportion to the number credits wagered on each gaming device.

In an embodiment, the method comprises sharing any award based on a number of games played on each gaming device in a designated period.

In a third aspect, the invention provides a linked game controller arranged to conduct a linked game in which eligible ones of a plurality of gaming devices participate and any award is shared between the participating gaming devices, the linked game controller arranged to determine a number of participating gaming devices, conduct the game by generating at least one game outcome and evaluating each game outcome to determine any award associated with the linked game to share based on the number of participating gaming devices.

In an embodiment, the linked game controller comprises a data communications interface for communicating with at least participating ones of the gaming devices and a participation module for determining from the communication the number of participating gaming devices.

In an embodiment, the data communication interface is arranged to poll each of the gaming devices whereby the participation module can determine based on any response to the polling whether a gaming device is participating.

In an embodiment, the data communication interface is arranged to monitor for a communication from each of the gaming devices indicative that the gaming device is participating whereby the participation module can determine based on monitored communication whether a gaming device is participating.

In an embodiment, the linked game controller comprises a memory storing game program code specifying game rules for generation and evaluation of a game outcome and a processor for executing the game program code.

In an embodiment, generating a game outcome comprises selecting a plurality of symbols for display at a plurality of display positions on at least one display controlled by the linked game controller and evaluating each game outcome comprises evaluating the displayed symbols based on an evaluation entitlement.

In an embodiment, the linked game controller is arranged to establish the evaluation entitlement of the participating gaming devices prior to evaluating a game outcome and to evaluate each game based on the established evaluation entitlement.

In an embodiment, the linked game controller is arranged to establish the evaluation entitlement by determining a number of win lines of an available number of win lines to be used in evaluation of the game outcome, each win line extending through a plurality of display positions.

In an embodiment, wherein a set number of win lines is added for each participating gaming device.

In an embodiment, the linked game controller is arranged to establish the evaluation entitlement by determining a number of active display positions to be used in forming combinations of display positions to be used in evaluation of the game outcome.

In an embodiment, the display positions correspond to a plurality of reels when the reels are stopped and the active display positions correspond to all display positions of each selected reel and at least one designated display position of each other reel, and wherein the number of selected reels corresponds to the number of participating gaming devices.

In an embodiment, the linked game controller is arranged to share any award in proportion to the number of gaming devices.

In an embodiment, the linked game controller is arranged to share any award in proportion to the number credits wagered per evaluation entitlement on each gaming device.

In an embodiment, the linked game controller is arranged to share any award in proportion to the number credits wagered on each gaming device.

In an embodiment, the linked game controller is arranged to share any award based on a number of games played on each gaming device in a designated period.

In a fourth aspect, the invention provides computer program code which when executed implements the above method.

In a fifth aspect, the invention provides a tangible computer readable medium comprising the computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Overview of Exemplary Gaming System

Figure 1:
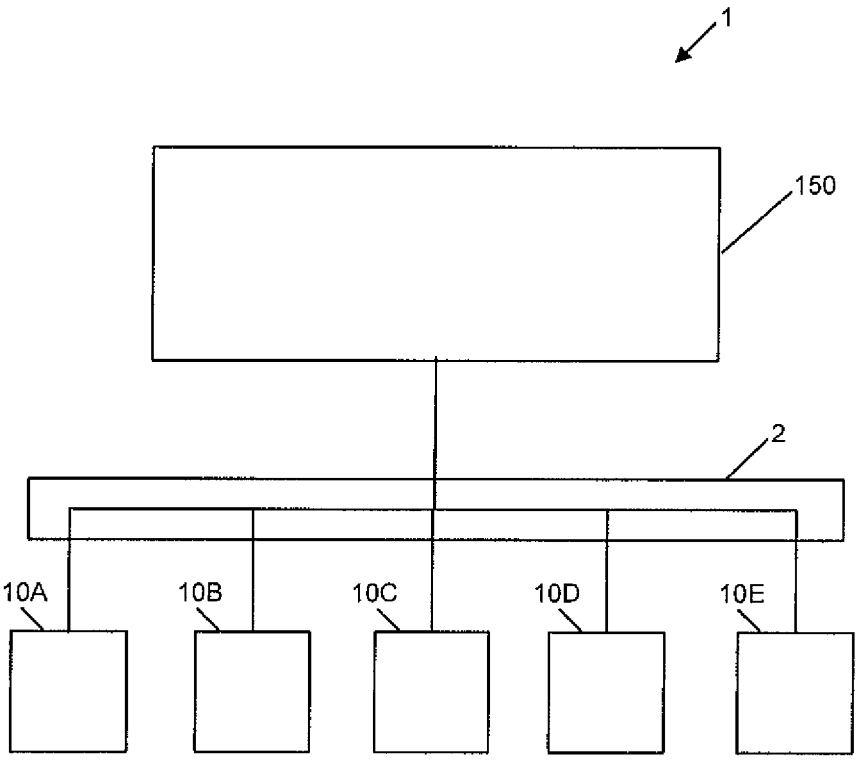
FIG. 1 is a block diagram of a gaming system with a linked game controller.

FIG. 1 shows an exemplary gaming system 1 where a linked game controller 150 is in data communication over a network 2, such as an Ethernet, with a bank of five gaming devices in the form of standalone gaming machines 10. The linked game controller 150 is arranged to communicate with the gaming devices to determine how many are participating. The linked game controller 150 implements a game where participating ones of the plurality of gaming devices 10 are entitled to share in any awards from the game and the manner in which the game is evaluated depends on the number of participating gaming devices 10.

Gaming Devices

Gaming devices capable of participating in the method of gaming of the embodiment can take any suitable form including stand alone gaming machines and server based gaming terminals.

Figure 2:
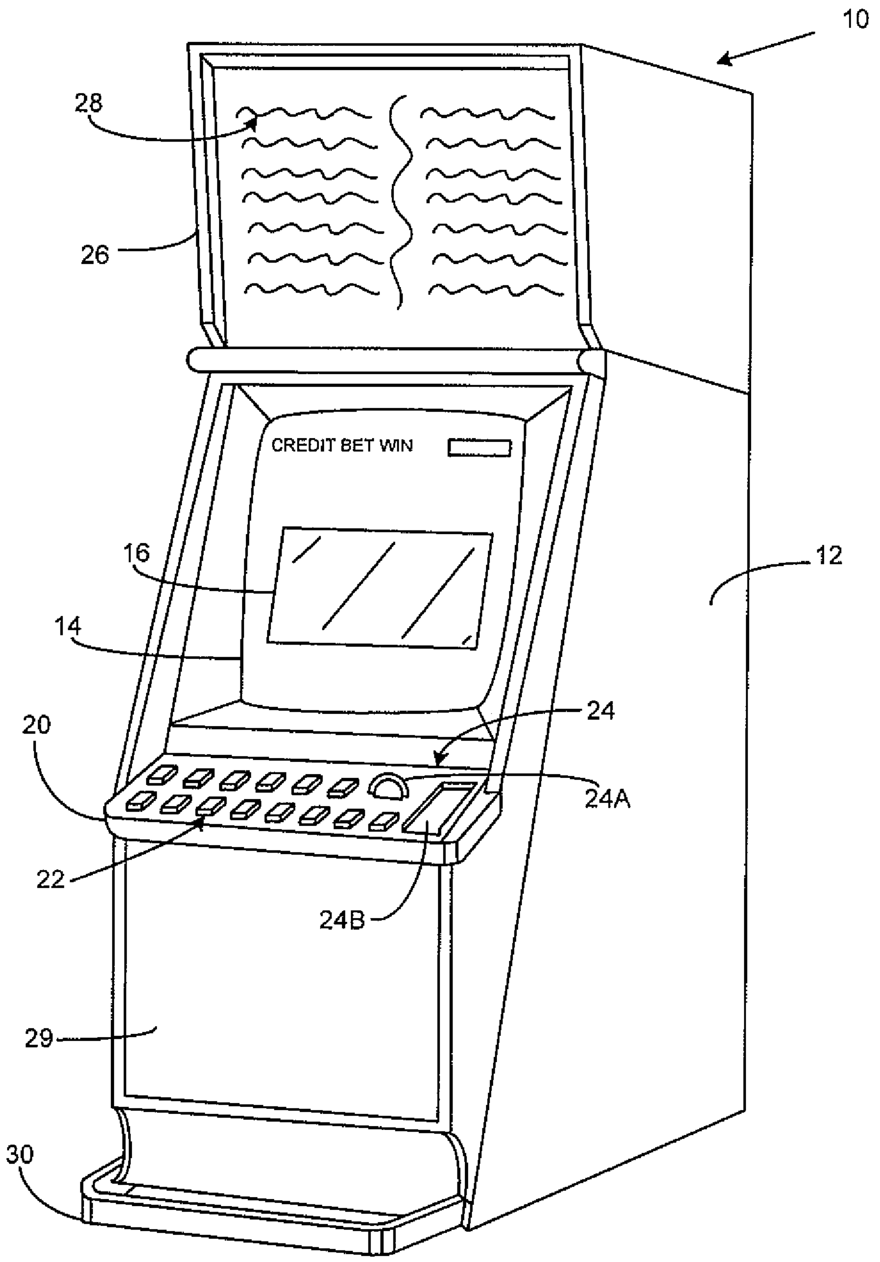
FIG. 2 is a perspective view of a stand alone gaming machine.

A gaming device in the form of a gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may be configured for ticket in that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
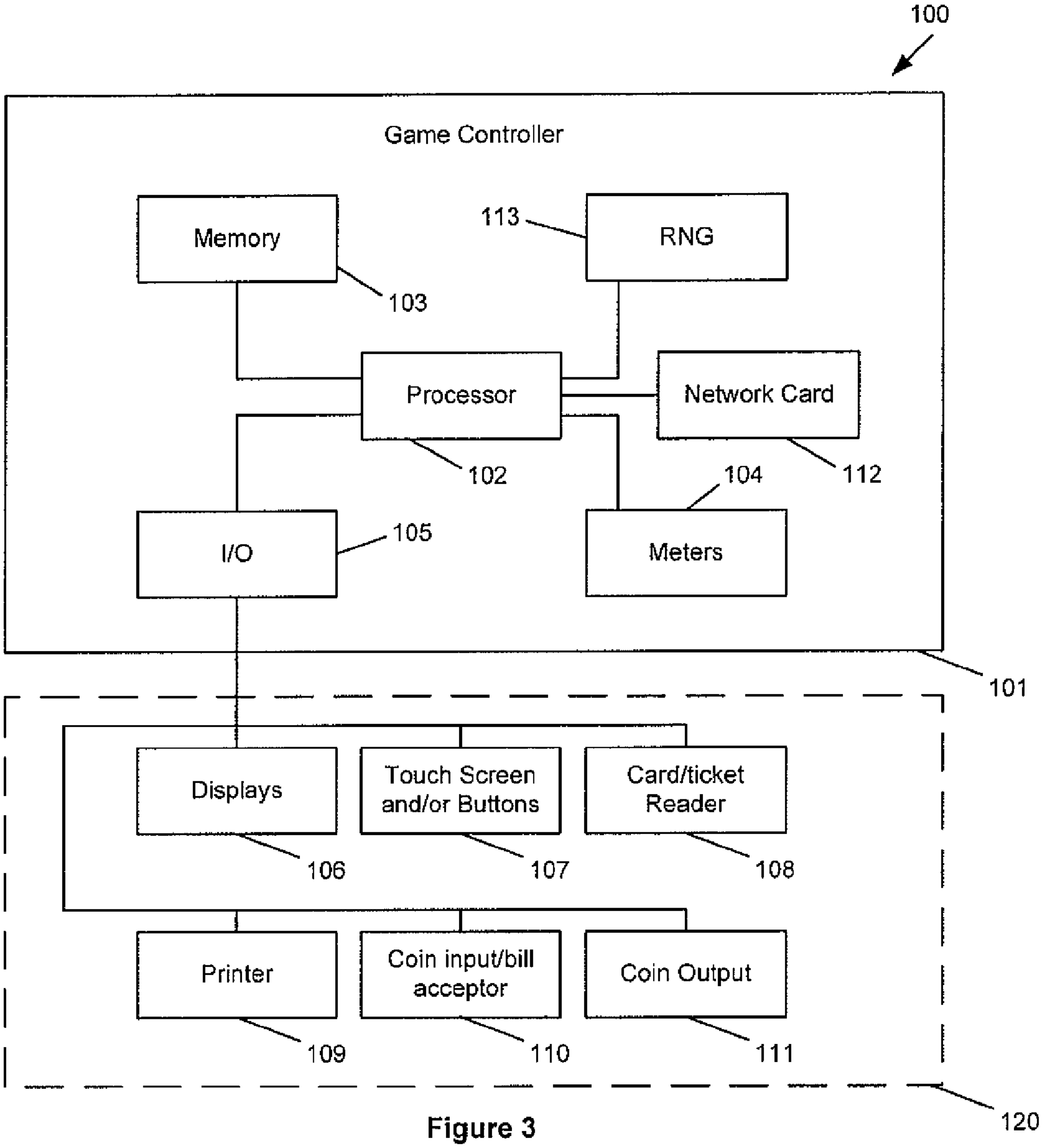
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
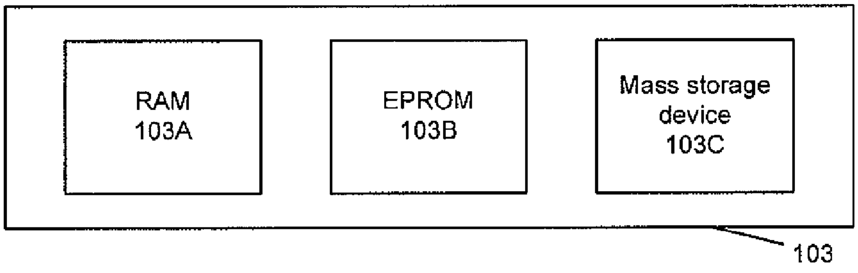
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

In a client server architecture a gaming device is provided by a gaming client and game server (and optionally other gaming network components). A gaming client has a similar outward appearance to gaming machine 10 but the game server implements most or all of the game and as such acts as the game controller while the terminal operated by the player essentially provides only the player interface. The gaming terminal receives player instructions, pass these to the game server which will process them and return game play outcomes to the gaming machine for display. Further details of a client/server gaming architecture can be found in WO 2006/052213 and PCT/SE2006/000559, the disclosures of which are incorporated herein by reference. In such an embodiment, a linked game controller can be provided, for example, by a dedicated server in data communication with the game server.

Figure 5:
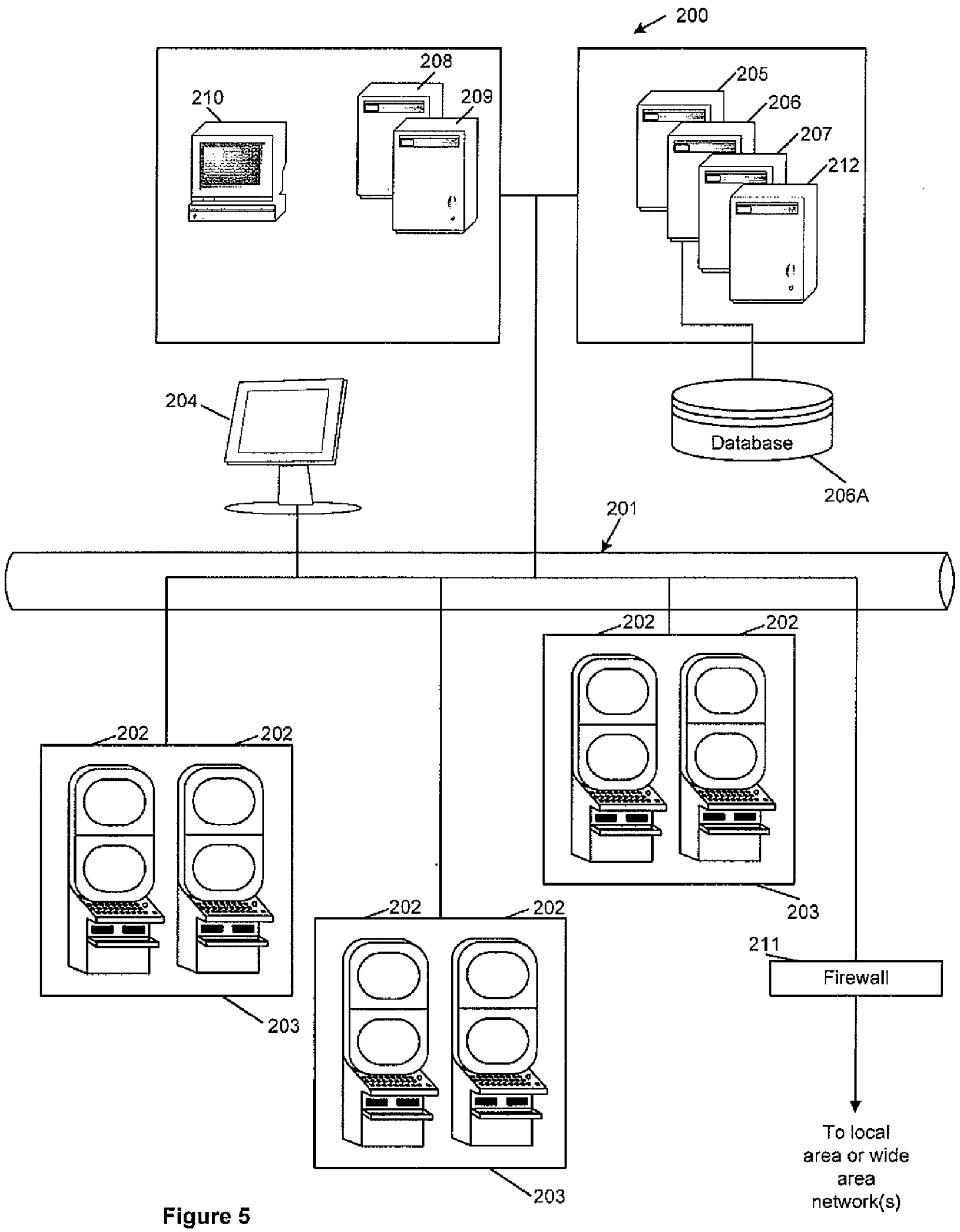
FIG. 5 is a schematic diagram of a network gaming system.

FIG. 5 shows that a gaming device may be connected within a gaming network 200 which provides additional and/or enhanced functionality. The gaming network 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

A linked game controller can be provided within such a network 200 by linked game server 205, such that the linked game server may implement a linked game for a plurality of different banks of gaming machines rather than a specific controller being provide for each bank of gaming machines.

A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Figure 9:
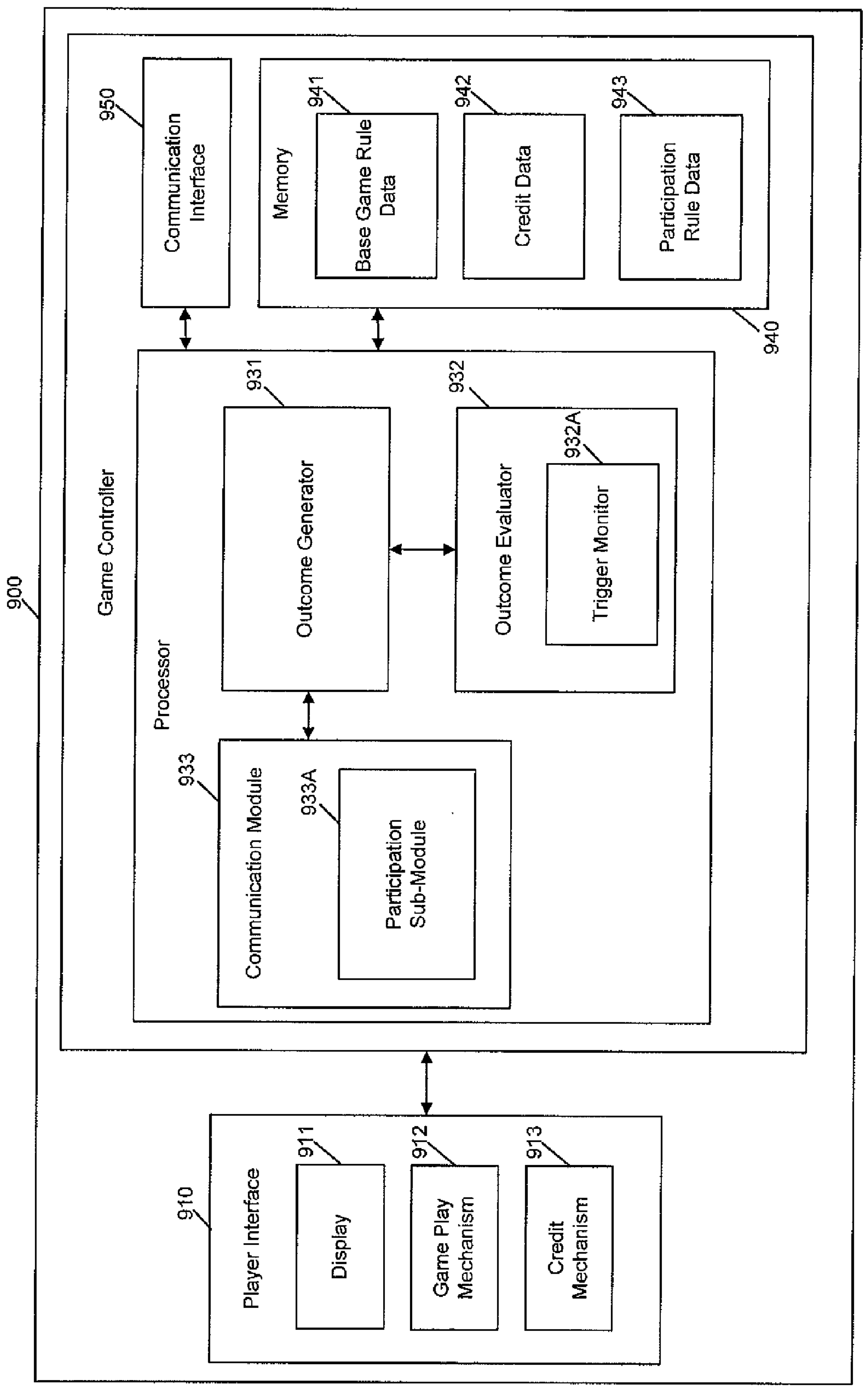
FIG. 9 is a functional block diagram of a gaming device in the form of a standalone gaming machine.

FIG. 9 is a functional block diagram of a gaming device in the form of a stand alone gaming machine. The gaming device 900 may be the same or different to gaming machine 10,100 described above. In FIG. 9, the processor 930 of game controller 920 is shown implementing a number of modules based on program code and data stored in memory 940. Persons skilled in the art will appreciate that various of the modules could be implemented in some other way, for example by a dedicated circuit.

The gaming device 900 includes a player interface 910 having a display 911 for displaying game outcomes to a player and a game play mechanism 912 including input devices such as touch screen or buttons to enable the player to interact with the game by placing wagers and entering any other instructions required to play the game. Game play mechanism 912 also enables the player to interact with the game to learn game rules etc. The player interface 910 includes a credit mechanism 913 allowing the player to input credit into the gaming device 900 and/or be paid out any winnings or remaining credit. A person skilled in the art will appreciate that other components will be present in a gaming device 900 such as those described in relation to FIGS. 2 to 4 above. The memory 940 includes program code for implementing a game including base game rule data 941 for implementing the rules of a base game.

The processor 930 when executing the program code stored in memory 940 is arranged to generate outcomes of the game in response to the operation of the game play mechanism 912. The outcomes are generated with the outcome generator 931. The outcome evaluator 932 evaluates the game outcomes that are generated based on the wager specified with the game play mechanism 912 and updates credit data 942 which stores a credit meter and a win meter for the game. The processor 930 also implements a communication module 933 which is intended to communicate by communication interface 950 with a linked game controller. As will be described in further detail below the communication module is arranged to indicate to the linked game controller whether the gaming device 900 is eligible to participate in a linked game.

Accordingly, the communication module may include a participation sub-module 933A which is intended to determine based on participation rule data whether the gaming device 900 is eligible to participate in the linked game. In one example, participation rule data 943 specifies a time period and participation sub-module 933A determines whether a game has been concluded within a defined time period prior to receipt of a polling request from the linked game controller. Alternatively participation sub-module communicates when the last game is completed. In this manner, the linked game controller 150 can determine whether the gaming device 900 is currently being played and is eligible to participate in the linked game.

Linked Game Controller and its Operation within the Gaming System

Figure 6:
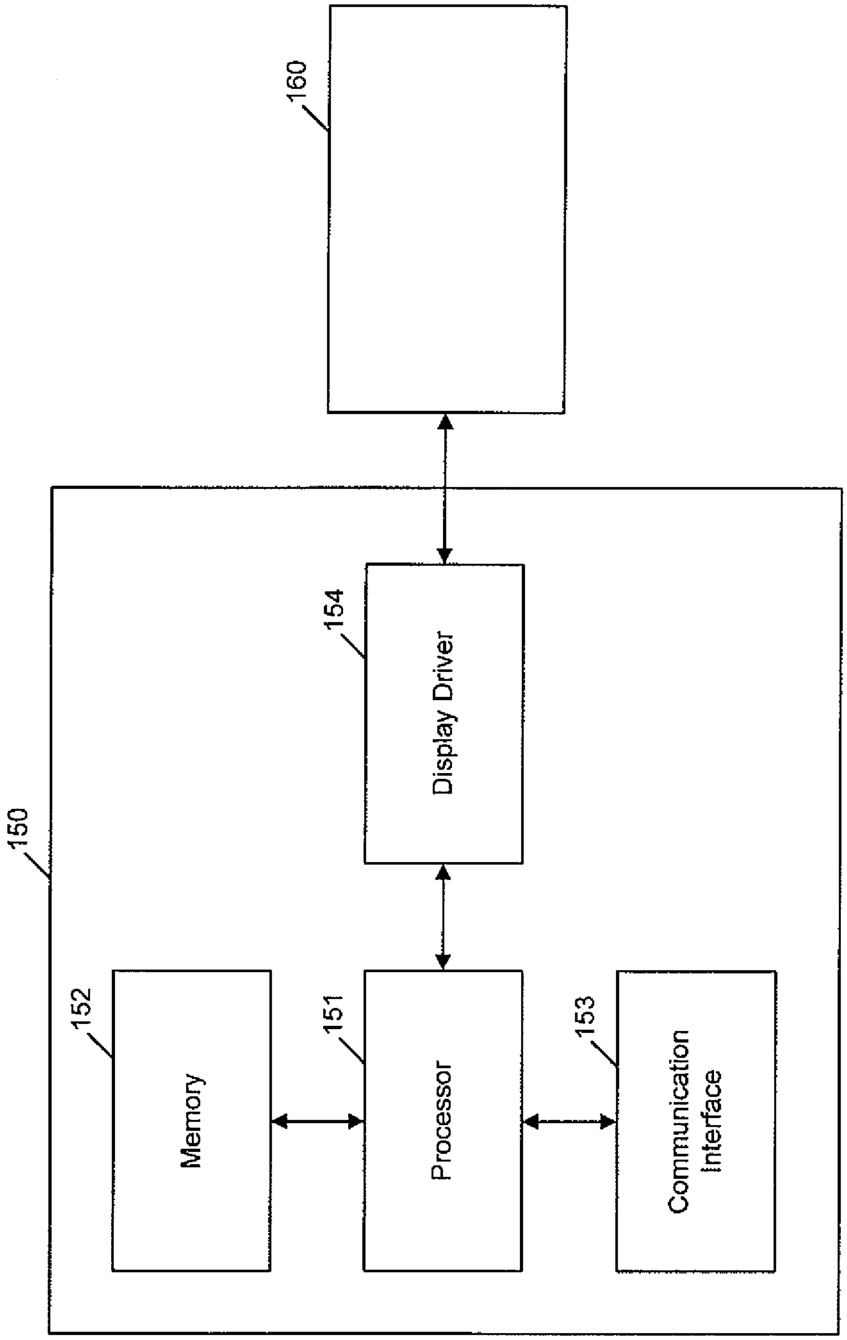
FIG. 6 is a block diagram of a linked game controller.

Referring to FIG. 6 there is shown further detail of the link game controller 150. From FIG. 6 it will be apparent that link game controller 150 is in data communication with a communal display 160 on which game outcomes can be displayed to the players playing the bank of gaming machines 10 shown in FIG. 1. In other embodiments, the gaming outcomes could be displayed on a top box of the individual gaming machines 10, rather than being displayed on a communal display, or in addition to such a display 160.

Referring to FIG. 6, the constitution of the linked game controller 150 is similar to that of the gaming device illustrated in relation to FIGS. 2 to 4 and 9 in that it has a processor 151 arranged to implement the linked game based on program code stored in memory 152 and a display driver 154 for driving the display 160 to show the linked game outcome. The linked game controller 150 also includes a communication interface 153 which is designed to enable the processor 151 to communicate with each of the gaming devices 10.

Persons skilled in the art will appreciate the above components are the core components for implementing a linked game but other components may be present in a linked game controller. Persons skilled in the art will appreciate that the implementation of the linked game controller is analogous to the implementation of bonus controllers in existing gaming systems and reference may be made to such bonus controllers for further details of implementation.

Figure 7:
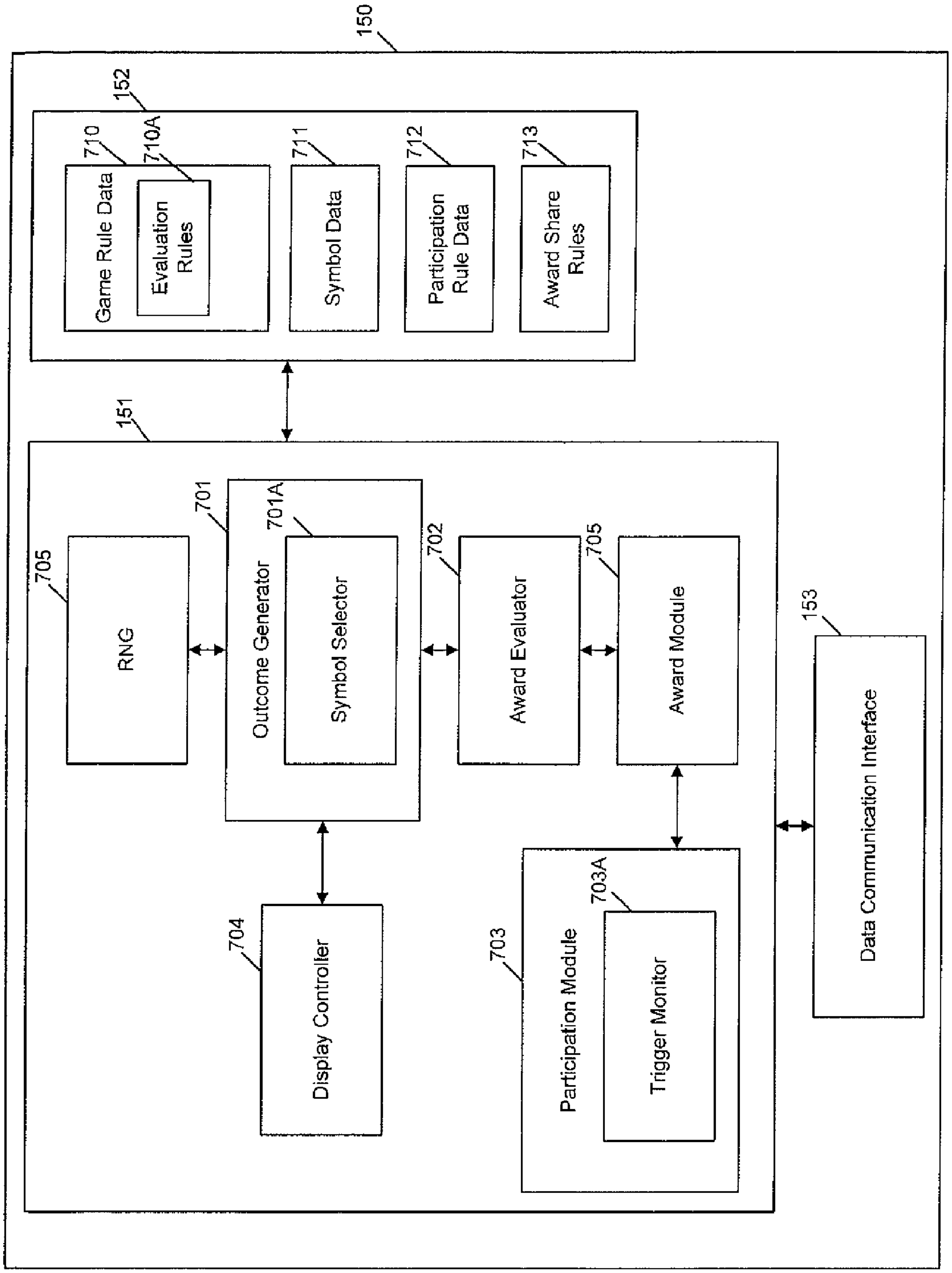
FIG. 7 is a functional block diagram of a linked game controller.

FIG. 7 is a functional block diagram of the linked gaming controller 150 which shows that the processor 151 implements a number of modules in a similar manner to the processor of the gaming device shown in FIG. 9. The processor executes program code stored in memory 152 to instantiate a participation module 703 which communicates via data communication interface 153 with each of the gaming devices. In one example, this communication includes polling each of the gaming devices. In another example this may be by listening to output on the network from each of the individual gaming devices. In any event, the participation module 703 determines based on participation rule data 712 the number of gaming machines which currently participating. That is, participation rule data 712 may specify how often the participation module should poll individual gaming machines or the time period within which the gaming machines need to have last indicated that they are active in order to participate in the game outcome.

Figure 8:
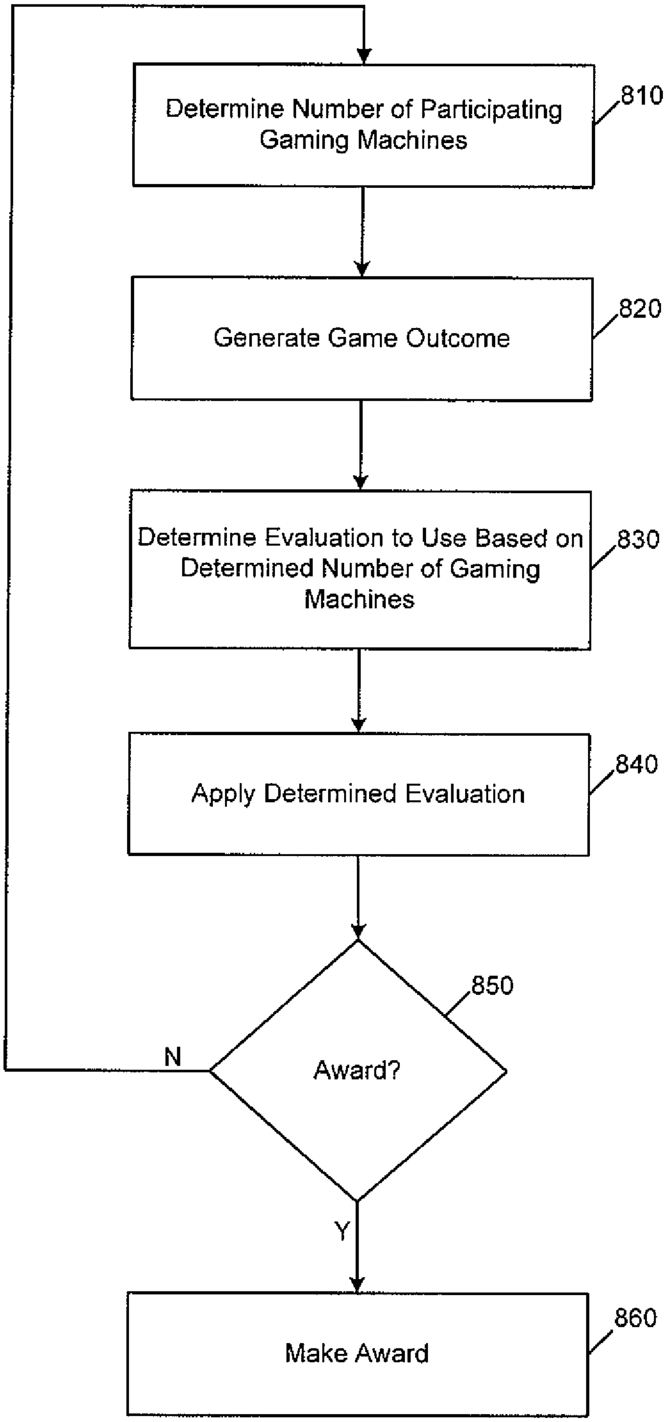
FIG. 8 is a flow chart of an embodiment.

In the specific example shown in FIG. 8, the participation module 703A includes a trigger monitor 703 which is designed to monitor for receipt of a trigger signal from one of the gaming devices. Such a trigger signal being output by communication interface 950 by trigger monitor 932A of outcome evaluator 932. The trigger monitor is arranged to determine based on the base game rule data 941 whether a trigger condition has been met. The trigger condition can be one of any known trigger condition in the art such as a particular symbol combination being achieved in the underlying base game. When the trigger is received by the trigger monitor 703A, participation module 703 polls each of the gaming machines to determine whether they have been active within a defined period. The participation sub module 933A of each gaming device 900 outputs whether they are active at the time based on the participation rule data 943 as well as data allowing the gaming machine to be identified and data required to determine how to share any award (if necessary). From these responses, participation module 703 determines the identity and number of active gaming devices to share in any award of the game conducted by the linked game controller and determines from the evaluation rules 710A of the game rule data 710 for the linked game the evaluation entitlement to be applied by the award evaluator 702.

The embodiment is described in relation to the evaluation of games where symbols are selected for display in a manner equivalent to a conventional spinning reel type game. In such embodiments, the evaluation entitlement may be based on how many lines are played in each game. Such win lines are typically formed by a combination of symbol display positions, one from each reel, the symbol display positions being located relative to one another such that they form a line.

In many games, the entitlement is not strictly limited to the selected win lines for example, "scatter" pays are awarded independently of a players selection of pay lines and are an inherent part of the evaluation entitlement.

Persons skilled in the art, will appreciate that in other embodiments, an evaluation entitlement may be based on a number of reels to play such as in games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Once the linked game controller establishes the evaluation entitlement, outcome generator 701 generates a game outcome to be evaluated which is displayed on display 160. In this example, by selecting symbols with a symbol selector 701A. One example of selecting symbols is for the symbol selector 701A to select symbols for display from a plurality of symbol sets corresponding to respective ones of a plurality of spinning reels. The symbol sets 711 can specify a sequence of symbols for each reel such that the symbol selector 701A can select all of the symbols by selecting a stopping position in the sequence using random number generator 705. In one example, three symbols of each of five reels may be displayed such that symbols are displayed at fifteen display positions on display 160 under control of display controller 704. It is known to use a probability table stored in memory 152 to vary the odds of a particular stop position being selected. Other techniques can be used to control the odds of particular outcomes occurring to thereby control the return to player of the game.

Accordingly, as described above, at the completion of the outcome generation process controlled by the outcome generator 701 a plurality of symbols are displayed at display positions on display 160 under control of display controller 704. The previously determined evaluation entitlement is applied by the award evaluator 702. It is determined whether any awards should be made based on game rule data 710—for example whether the symbols of the display positions of an active win line or in an active way to win correspond to designated symbol combinations in a pay table. Any awards are then made under control of award modules 705 applying award share rules 713. That is, an award is made proportionally to each player in accordance with any rules for sharing the prize. Depending on the embodiment the award may be made proportionally in a number of different of ways. For example proportional to the number of machines in play; proportional to the number of credits bet at each machine; or proportional to the amount bet at each machine.

Persons skilled in the art will appreciate that while the above example describes the linked game being triggered, the link game could instead be carried out periodically with each gaming device that played in a previous time period being entitled to share in any awards the linked game.

The method of embodiment is summarised in FIG. 8 which shows that the method involves determining 810 a number of participating gaming machines, generating 820 a game outcome, determining 830 the evaluation to be used based on the determined number of gaming machines, applying 840 the determined evaluation. It is then determined 850 whether an award is to be made and when an award is to be made, it is made 860 in accordance with any rules for sharing the award.

Further aspects of the method will be apparent from the above description of the gaming system. Persons skilled in the art will also appreciate that the method could be embodied in program code. The program code could be supplied in a number of ways, for example on a tangible computer readable medium, such as a disc or a memory, or as a data signal (for example, by transmitting it from a server).

Example

Figure 10A:
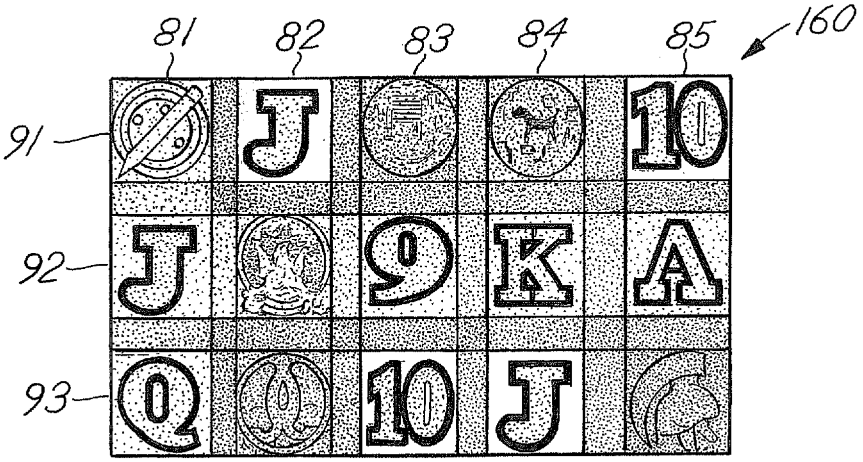
FIGS. 10A to 10C are exemplary screen shots of a linked game.

An example of a game implemented in accordance with the embodiment is shown in relation to FIG. 10. In this example, there are five gaming devices and the win entitlement is established using a reel power type game such that a reel is added for each participating gaming device such that there are 243 ways to win when all five gaming machines are active. FIG. 10A shows an example of the display 160 showing a case where a single gaming device is determined to be active. FIG. 10 shows that a set of symbols have been selected for display at 15 display positions arranged in five columns corresponding to respective ones of five reels 81, 82, 83, 84, 85 and 3 rows 91, 92, 93. In this reel power type game with a singe active gaming device the first reel or column 81 shown as active with the central display position of the central row 92 shown as active for the remaining reels. That is, the light coloured or highlighted display positions represent the active display positions to be used in the evaluation of the game outcome such that with one gaming machine, there are only 3 ways to win.

Figure 10B:
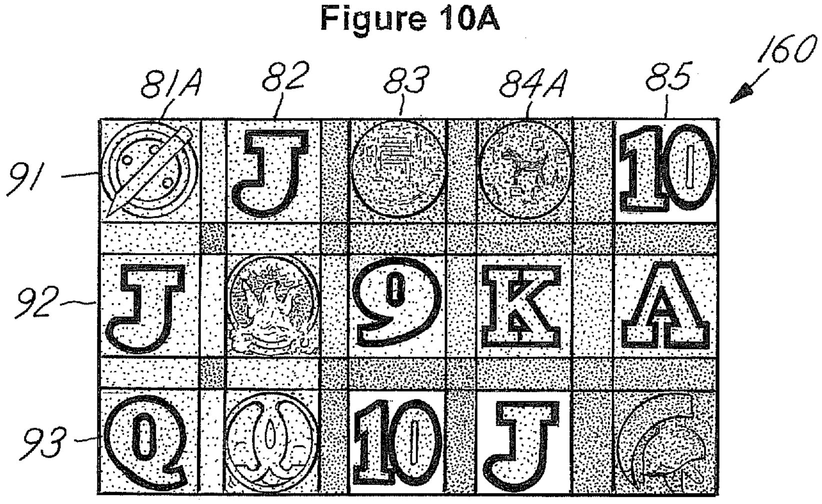
Figure 10C:
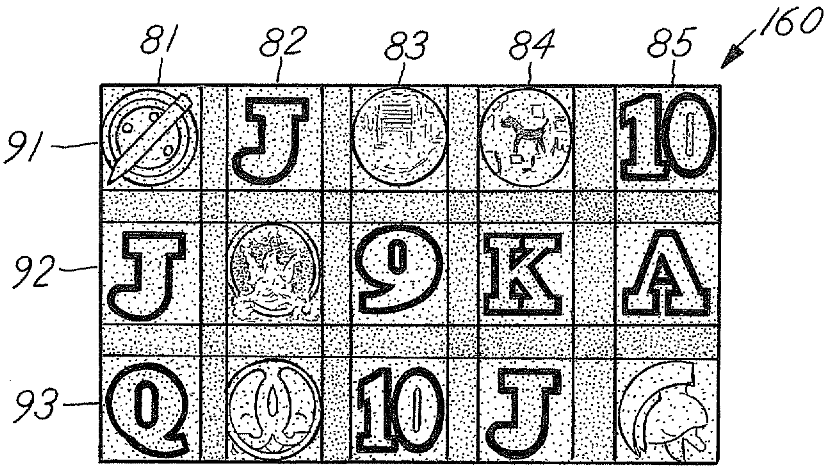

FIG. 10B shows a case where two gaming machines are active such that columns 81 and 82 are active in the evaluation of the game outcomes and there are nine ways to win. FIG. 10C shows the case where five machines are active such that all columns 81 to 85 are active such that that the maximum number of ways for the gaming outcome to be evaluated will be evaluated in respect of the gaming outcome displayed on display 160 in FIG. 10C.

Persons skilled in the art will appreciate that there can be variations on the above embodiment, for example specific columns may be made active dependent on which gaming machine is active. However, the example given in FIG. 10A has the advantage that it can be readily employed with existing games where players select reels to play which alternatively be presented as ways to win. That is, an input derived from the number of participating games can readily be integrated with an existing game using this type of evaluation.

It will be understood to persons skilled in the art of the invention that many modifications may be made without departing from the spirit and scope of the invention, in particular it will be apparent that certain features of embodiments of the invention can be employed to form further embodiments.

For example, the linked game controller 150 is shown in FIG. 1 as a separate entity to the gaming devices 10. In an alternative embodiment, it could be provided by one of the gaming devices incorporating a server module arranged to implement the linked game controller in the manner described in Australian patent application 2008205413 filed 13 Aug. 2008.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gaming system comprising:

a plurality of gaming devices, each of the plurality of gaming devices comprising: a credit input mechanism, a cashout device, and a controller, wherein the credit input device is configured to receive a physical item associated with a monetary value for establishing a credit balance that increases and decreases based at least on wagering activity, and wherein the controller is configured to facilitate a base wagering game in accord with receiving a wager amount placed for play of the base wagering game, the wager amount decreasing the credit balance; and wherein the cashout device is configured to receive a detected cashout request, the cashout request causing an initiation of a payout associated with the credit balance, via the cashout device;

at least one display device configured to present a plurality of reels such that each reel displays a plurality of symbols; and a linked game controller in data communication with each of the plurality of gaming devices and the at least one display device, the linked game controller configured to:

determine which of the plurality of gaming devices are eligible gaming devices to participate in the linked game based on at least one predetermined criterion;

determine a quantity of eligible game devices based on said determination of which of the plurality of gaming devices are eligible gaming devices to participate in the linked game;

select a number of reels from the plurality of reels as active reels corresponding to the quantity of eligible gaming devices;

generate and display, via the at least one display device, a linked game outcome by causing each of the plurality of reels to spin to a stop position regardless whether a respective reel is an active reel;

determine an award associated with the linked game outcome based on each of the plurality of symbols displayed by each of the active reels presented in the linked game outcome displayed on the at least one display device and only a single displayed symbol selected from each reel that is not an active reel presented in the linked game outcome displayed on the at least one display device; and distribute a portion of the determined award associated with the linked game outcome to each of the eligible gaming devices, the portion of the determined award distributed to each eligible gaming device increasing the respective credit balance of the eligible gaming device.

2. A gaming system as claimed in claim 1, wherein the linked game controller is further configured to determine the award associated the linked game outcome based on a number of win lines, wherein the number of win lines is based on the quantity of eligible gaming devices, and wherein each win line extends through a displayed symbol of each of the plurality of reels in the linked game outcome.

3. A gaming system as claimed in claim 1, wherein the determined award is distributed in proportion to a number credits wagered on each eligible gaming device.

4. A gaming system as claimed in claim 1, wherein the determined award is distributed in proportion to a number credits wagered on each gaming device.

5. A gaming system as claimed in claim 1, wherein the determined award is based on a number of base wagering games played on each gaming device during a designated period.

6. A gaming system as claimed in claim 1, wherein each of the plurality of gaming devices is individually operable to play at least the base wagering game and the linked game is played in addition to the base wagering game.

7. A gaming system as claimed in claim 6, wherein the linked game controller comprises a non-transitory memory device storing game program code specifying game rules for generation and evaluation of the linked game outcome and a processor for executing the game program code.

8. A gaming system as claimed in claim 1, wherein the linked game controller further comprises: a data communications interface configured to communicate with the plurality of gaming devices; and a participation module, stored on a non-transitory memory device, which when executed by the game controller is configured to determine from the communication with the plurality of gaming devices, the quantity of eligible gaming devices.

9. A gaming system as claimed in claim 8, wherein:

the data communication interface is configured to poll each of the gaming devices; and the participation module is configured to determine based on any response to the polling whether a gaming device is eligible.

10. A gaming system as claimed in claim 8, wherein:

the data communication interface is configured to monitor for a communication from each of the gaming devices indicative that the gaming device is participating; and the participation module is configured to determine based on monitored communication whether a gaming device is eligible.

11. A gaming system as claimed in claim 1, wherein each gaming device comprises a communication interface configured to communicate with a data communication interface of the linked game controller to enable the linked game controller to determine whether a gaming device is participating.

12. A gaming system as claimed in claim 1, wherein said linked game controller is further configured to evaluate the linked game outcome based on predefined criteria in which at least one additional predefined criterion is applied for each additional eligible gaming device that participates in the linked game.

13. A method of gaming for use with a plurality of gaming devices and a linked game controller, the method comprising:

receiving, via a credit input mechanism of each gaming device of the plurality of gaming devices, a physical item associated with a monetary value for establishing a credit balance that increases and decreases based at least on play of a base wagering game at the respective gaming device;

receiving, at each gaming device of the plurality of gaming devices, a wager amount placed for play of the base wagering game, the wager amount decreasing the credit balance at the respective gaming device;

presenting, via at least one display device coupled to the linked controller, a plurality of reels such that each reel displays a plurality of symbols;

determining, by the linked game controller, which of the plurality of gaming devices are eligible gaming devices to participate in the linked game based on at least one predetermined criterion;

determining, by the linked game controller, a quantity of eligible gaming devices based on the determination of which of the plurality of gaming devices are eligible gaming devices to participate in the linked game;

selecting, by the linked game controller, a number of reels from the plurality of reels as active reels corresponding to the quantity of eligible gaming devices;

generating by the linked game controller, and displaying, via the at least one display device, a linked game outcome by causing each of the plurality of reels to spin to a stop position regardless of whether the respective reel is an active reel;

evaluating, by the linked game controller, the linked game outcome to determine an award associated with the linked game outcome based on each of the plurality of symbols displayed by each of the active reels presented in the linked game outcome displayed on the at least one display device and only a single displayed symbol selected from each reel that is not an active reel presented in the linked game outcome displayed on the at least one display device;

distributing, by the linked game controller, the determined award associated with the linked game outcome to each of the eligible gaming devices, the portion of the determined award distributed to each eligible gaming device increasing the respective credit balance of the eligible gaming device; and receiving, by at least one of the gaming devices, a cashout request, the cashout request causing an initiation of a payout associated with the credit balance of the at least one gaming device, via a cashout device associated with the at least one gaming device.

14. A method as claimed in claim 13, wherein said evaluating comprises evaluating the linked game outcome based on a number of win lines, wherein the number of win lines is based on the quantity of eligible gaming devices, to be used in evaluating the linked game outcome, and wherein each win line extends through a displayed symbol of each of the plurality of reels in the linked game outcome.

15. A method as claimed in claim 13, further comprising distributing the determined award in proportion to the quantity of eligible gaming devices.

16. A method as claimed in claim 13, further comprising distributing the determined award in proportion to a number credits wagered on each gaming device.

17. A method as claimed in claim 13, further comprising distributing the determined award in proportion to a number credits wagered on each eligible gaming device.

18. A method as claimed in claim 13, further comprising distributing the determined award based on a number of base wagering games played on each gaming device during a designated period.

19. A method as claimed in claim 13, further comprising evaluating the linked game outcome based on predefined criteria in which at least one additional predefined criterion is applied for each additional eligible gaming device that participates in the linked game.

20. A linked game controller for use with a plurality of gaming devices, the linked game controller comprising:

hardware meters configured to ensure regulatory compliance for wagering monetary value on games of chance;

a random number generator configured to generate a random value; and a processor configured to:

determine which of a plurality of gaming devices are eligible gaming devices to participate in a linked game based on at least one predetermined criterion;

determining a quantity of eligible gaming devices based on said determination of which of the plurality of gaming devices are eligible gaming devices to participate in the linked game;

displaying, on at least one display device coupled to the linked game controller, a plurality of reels such that each reel displays a plurality of symbols;

select a number of reels from a plurality of reels as active reels corresponding to the quantity of eligible gaming devices;

generate and display, on the at least one display device, a linked game outcome by causing each of a plurality of reels to spin to a stop position based on the random value of the random number generator, regardless of whether a respective reel is an active reel;

evaluate the linked game outcome based on each of the plurality of plurality of displayed symbols displayed by each of the active reels displayed in the linked game outcome on the at least one display device and only a single displayed symbol selected from each reel that is not an active reel displayed in the linked game outcome displayed on the at least one display device;

determine an award associated with the evaluated linked game outcome; and distributing a portion of the determined award associated with the linked game outcome to each of the eligible gaming devices, the portion of the determined award distributed to each eligible gaming device increasing a respective credit balance of the eligible gaming device.

21. A linked game controller as claimed in claim 20, further comprising:

a data communications interface configured to communicate with each of the plurality of gaming devices; and a participation module, stored on a non-transitory memory device, which when executed by the game controller is configured to determine from the communication the quantity of eligible gaming devices.

22. A linked game controller as claimed in claim 21, wherein:

the data communication interface is configured to poll each gaming device of the plurality of gaming devices; and the participation module is configured to determine based on any response to the polling whether a gaming device is one of the eligible gaming devices to participate in the linked game.

23. A linked game controller as claimed in claim 21, wherein:

the data communication interface is configured to monitor for a communication from each gaming device of the plurality of gaming devices indicative that the gaming device is participating; and the participation module is configured to determine based on monitored communication whether a gaming device is eligible to participate in the linked game.

24. A linked game controller as claimed in claim 20, further comprising:

a non-transitory memory device storing game program code specifying game rules for generation and evaluation of the linked game outcome; and a processor for executing the game program code.

25. A linked game controller as claimed in claim 20, wherein said linked game controller is further configured to evaluate the linked game outcome based on a number of win lines, wherein the number of win lines is based on the quantity of eligible gaming devices, and wherein each win line extends through a displayed symbol of each of the plurality of reels in the linked game outcome.

26. A linked game controller as claimed in claim 20, wherein the linked game controller is further configured to distribute the determined award in proportion to a number credits wagered on each gaming device.

27. A linked game controller as claimed in claim 20, wherein the linked game controller is further configured to distribute the determined award in proportion to a number credits wagered on each eligible gaming device.

28. A linked game controller as claimed in claim 20, wherein the linked game controller is further configured to distribute the determined award based on a number of base wagering games played on each gaming device during a designated period.

29. A linked game controller as claimed in claim 20, wherein the linked game controller is further configured to evaluate the linked game outcome based on predefined criteria in which at least one additional predefined criterion is applied for each additional eligible gaming device that participates in the linked game.

* * * * *